May 19, 1936.  D. FERGUSSON  2,041,599
VEHICLE CONSTRUCTION
Filed March 18, 1933    3 Sheets-Sheet 1
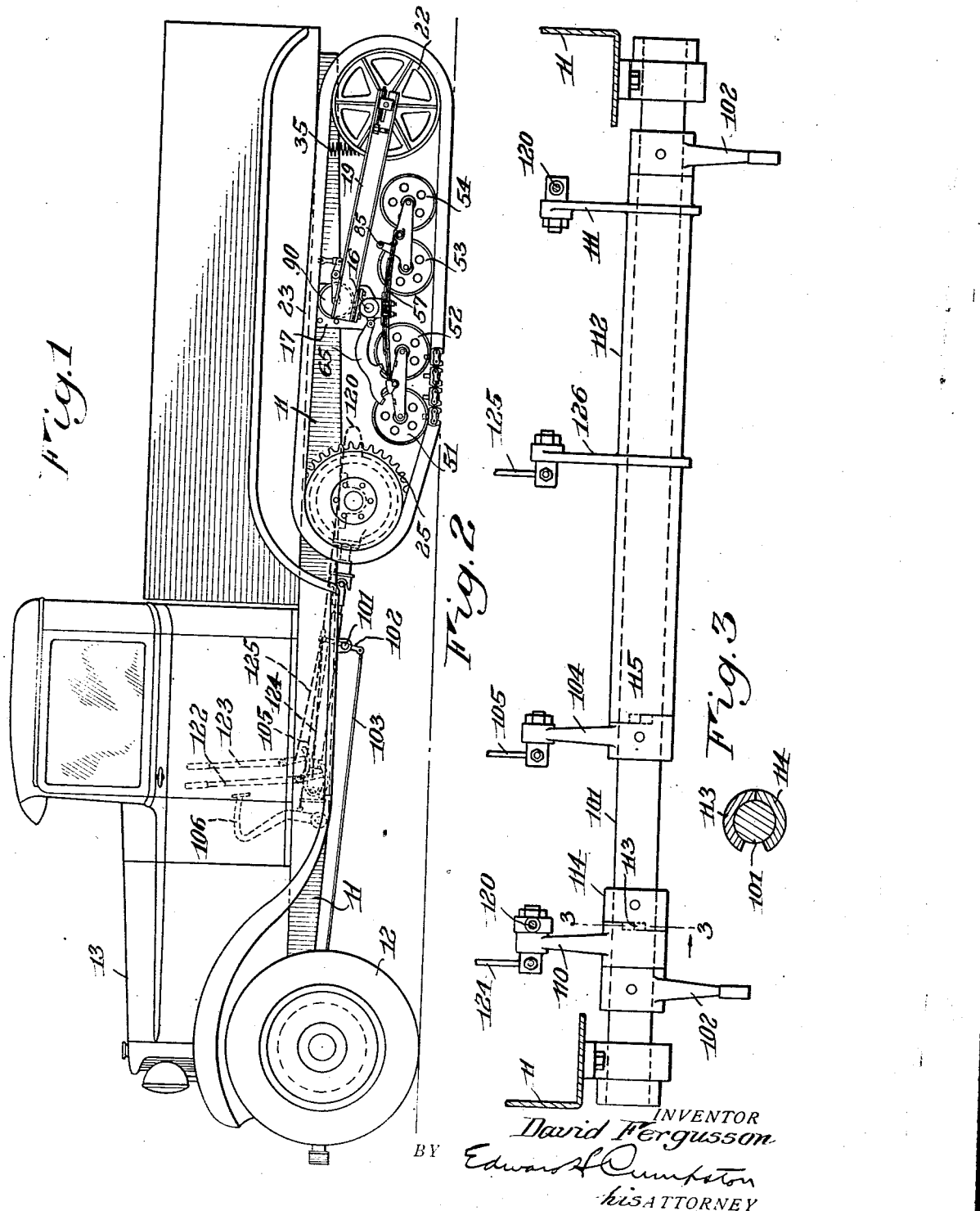

May 19, 1936. D. FERGUSSON 2,041,599
VEHICLE CONSTRUCTION
Filed March 18, 1933 3 Sheets-Sheet 2
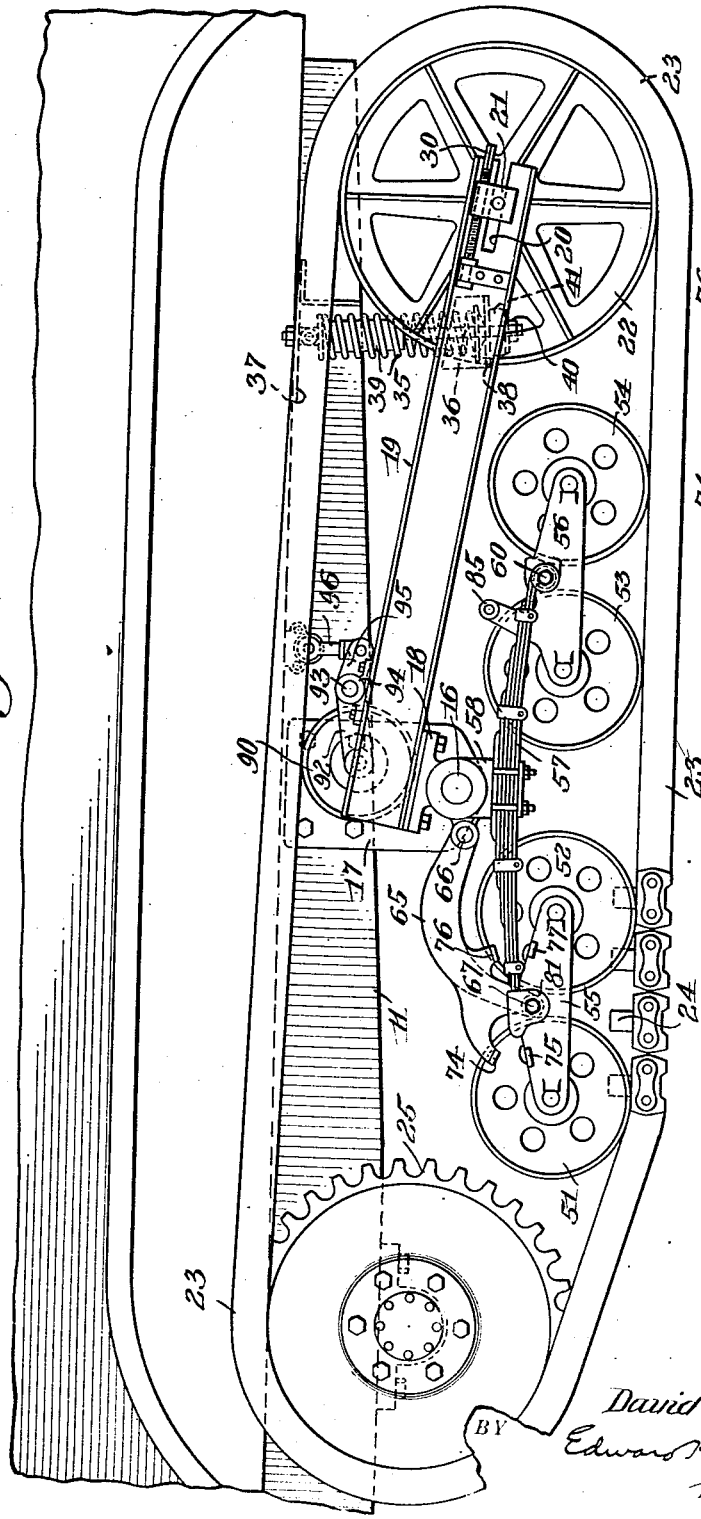
INVENTOR
David Fergusson
BY Edward H. Cumpston
his ATTORNEY May 19, 1936.　　　D. FERGUSSON　　　2,041,599
VEHICLE CONSTRUCTION
Filed March 18, 1933　　　3 Sheets-Sheet 3
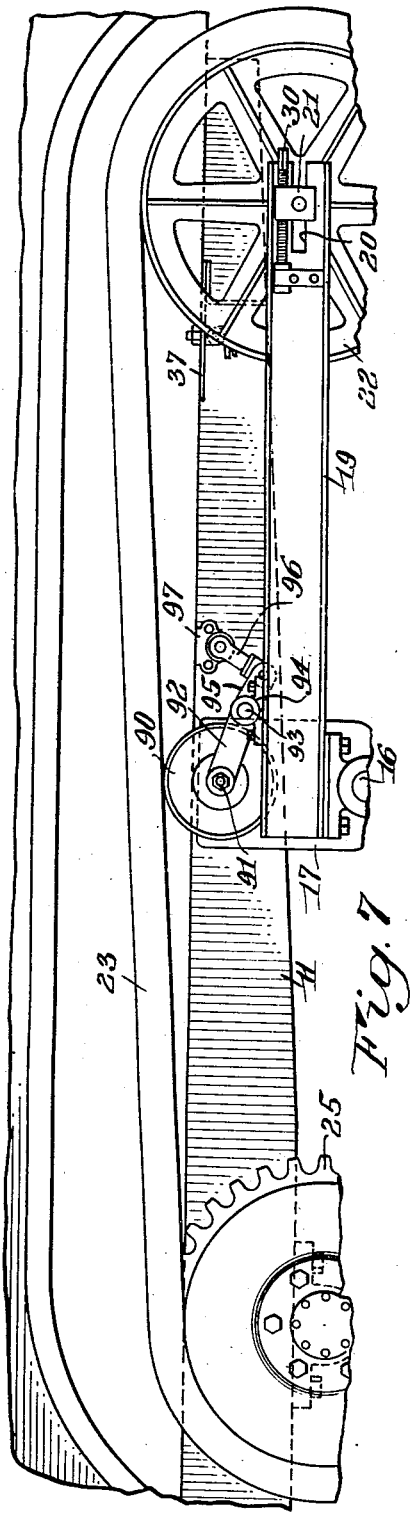
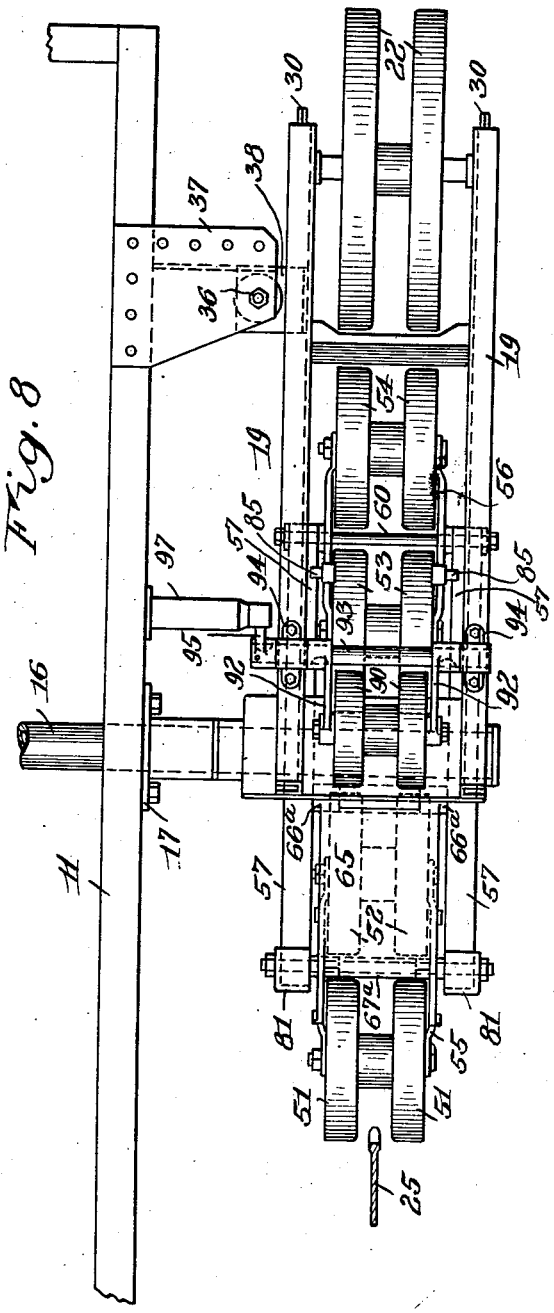
INVENTOR
David Fergusson
BY Edward H. Cumbston
his ATTORNEY Patented May 19, 1936

2,041,599

UNITED STATES PATENT OFFICE 2,041,599

VEHICLE CONSTRUCTION

David Fergusson, Rochester, N. Y., assignor to James Cunningham Son & Company, Rochester, N. Y., a corporation of New York Application March 18, 1933, Serial No. 661,557

4 Claims. (Cl. 305—9)

This invention relates to track laying vehicles; that is, vehicles in which successive portions of an endless member are laid upon the ground or other supporting surface to form the track over which one or more weight supporting wheels may roll. Many features of the present invention are applicable equally well to vehicles in which the entire weight of the vehicle is supported on such tracks (these being frequently known as full track laying vehicles) while some other features of the invention are adapted more particularly to a vehicle in which only part of the weight is supported on endless tracks and another part is supported on ordinary wheels (these being frequently known as half track laying vehicles).

An object of the invention is the provision of a generally improved and more satisfactory track laying vehicle, which may be manufactured readily and inexpensively, which is sturdy and efficient in operation, and which is capable of either military or commercial use.

Another object is the provision of improved track mechanism for track laying vehicles, whether of the full track laying type or the half track laying type, which track mechanism is simple and sturdy, not likely to get out of order, and effective and satisfactory in use even over extremely rough ground.

A further object is the provision of an improved mounting for the rear rotary member or idler of the track, permitting this rear idler to move up a substantial distance under predetermined ground conditions in order that the weight on the track may be evenly distributed, and also the provision of improved means for supporting the upper reach of the endless track when the rear idler moves upwardly, to give this upper reach adequate support at all times notwithstanding the upward and downward movements of the idler.

A still further object is the provision, in a vehicle of the half track laying type which is normally steered by wheels, of improved braking mechanism permitting the vehicle to be steered readily even if the wheels have insufficient traction (as when resting on ice, snow, or soft mud) or when they are temporarily out of contact with the ground under abnormal conditions.

An additional object is the provision of a half track laying vehicle so designed and constructed that it may be built up from a standard automobile truck chassis readily available on the commercial market, thus reducing the expense of manufacture and providing a vehicle many parts of which are standard and easily obtainable.

To these and other ends the invention resides in certain improvements and combinations of parts, all as will be hereinafter more fully described, the novel features being pointed out in the claims at the end of the specification.

In the drawings:

Fig. 1 is a side elevation of a half track laying vehicle constructed in accordance with a preferred embodiment of the invention;

Fig. 2 is a rear view, with parts in vertical section, of a shaft and associated arms forming a part of the brake rigging of the vehicle shown in Fig. 1;

Fig. 3 is a transverse section substantially on line 3—3 of Fig. 2;

Fig. 4 is a side elevation of the track mechanism on one side of the vehicle;

Fig. 5 is a plan of a link connecting one of the bogie trucks to the frame of the vehicle to keep the bogie truck properly alined;

Fig. 6 is a side view of a fragment of the mechanism illustrating the connection between the bogie truck and its spring;

Fig. 7 is a view similar to a part of Fig. 4, but showing the rear idler elevated to a higher position, and Fig. 8 is a plan of the parts shown in Fig. 4 omitting the endless track member and certain other parts for the sake of clearness.

The same reference numerals throughout the several views indicate the same parts.

While the vehicle illustrated in this application is of the half track laying type it will be readily understood by those skilled in the art that the various details of the track mechanism are applicable equally well to vehicles of the full track laying type in which the entire weight of the vehicle is supported from the tracks.

In the preferred vehicle of the present invention there is provided a vehicle frame 11 near the front end of which is mounted a pair of front wheels 12. Any suitable motive power, such as an internal combustion engine within the hood 13 is mounted on the frame. The front end of the vehicle is supported by the wheels 12, which are used for steering the vehicle under normal conditions, while the rear end, in the preferred form, is supported by the track mechanism now to be described with special reference to Figs. 4 and 8.

The vehicle frame is provided near its rear end with a strong cross shaft or tube 16 secured to the frame in any suitable manner as by means of the brackets 17, which shaft or tube projects somewhat beyond each side of the frame 11. A bearing member 18 is mounted for oscillation on the projecting end at each side of the vehicle, and to each bearing member is secured a pair of rearwardly extending arms 19 which may be conveniently formed of channel-shaped members. The arms on each side of the vehicle are secured to each other to form, in effect, a single arm, and extend rearwardly for a substantial distance and are provided adjacent their rear ends with guideways in the form of slots 20 running longitudinally of the channel members, in which slots are slidably mounted bearings 21 of a rear idler 22 of relatively large diameter, around which passes endless track means indicated diagrammatically by the numeral 23, which may be made up of a series of links or in any other suitable way, and which preferably is provided with guiding means such as the upstanding guiding lugs 24. Each idler 22 is preferably split in the center; that is, it comprises two wheel-like portions with a peripheral slot or space between them, as shown in Fig. 8 of the drawings, and the guiding lugs 24 on the track member 23 extend into this space to guide the track member as it goes around the idler and prevent lateral displacement of it.

The endless track means, after passing upwardly around the idler 22 during advance movement of the vehicle, runs forwardly along an upper reach or stretch to a rotary driving member such as a driving sprocket 25 mounted on a rear axle secured to the frame 11 at a point in advance of the transverse member 16, which rear axle may be driven through a usual automobile drive from the engine within the hood 13. The endless track member 23, after passing downwardly around the driving sprocket 25, then extends rearwardly through a lower reach or stretch adapted to rest upon the ground or other supporting surface. The teeth of the driving sprocket may engage with suitable cross pins on the endless member 23, in a longitudinal vertical plane between the guiding lugs 24, as well understood by those skilled in the art.

The pair of rotary members 22 and 25, and the endless track means 23 running around and between them, and the associated parts hereafter to be described, are provided in duplicate, one on each side of the vehicle, as will be readily apparent to those skilled in the art. A description of the track mechanism on one side of the vehicle will suffice for that on the opposite side also, and in the following description, therefore, the parts will be referred to in general only as they occur on one side of the vehicle.

Adjusting means such as the adjusting screws 30 are provided for moving the bearings 21 of the rear idler 22 backwardly and forwardly along the guide 20, so that the tension of the endless track 23 may be adjusted as desired.

In order to adapt the vehicle to travel over rough ground, the rear idler is preferably movable vertically. Since the idler is mounted upon the arms 19 which, in turn, are mounted for oscillation about the member 16 as an axis, it follows that the upward and downward movements of the idler may take place by oscillating the arms 19. These upward and downward movements may be controlled and regulated by any suitable means such, for example, as the coiled spring 35 surrounding a rod 36 connected at its upper end to a bracket 37 on the frame 11 and at its lower end to a bracket 38 on one of the arms 19. The spring 35 resists and cushions upward movement of the arm 19, and stop means such as a resilient block 39 of rubber or the like may be placed within the upper end of the spring 35 to come into contact with the bracket plate 38 when the arm 19 is raised to a predetermined extent, to stop further upward movement. The lower end of the rod 36, projecting beneath the bracket 38, may be provided with a nut 40 and with a cushioning member such as a block of rubber 41 above the nut, in order to cushion and limit the downward movements of the arm 19.

It will be apparent that the normal or lowermost position of the arm 19, and consequently of the idler 22, is determined by the position of the nut 40 and resilient block 41. Ordinarily it is desired to have this lowermost position substantially as shown in Fig. 4, so that the track 23 immediately beneath the idler 22 will be in contact with the ground when the vehicle is travelling over smooth ground. In some instances, however, it may be desired to maintain the rear idler temporarily or permanently in a position somewhat above its preferred position, and this can be done readily by screwing up the nut 40 on the rod 36, by which means the rear idler may be elevated and held in any desired higher position. Preferably the rod 36 is threaded through most or all of its length, in order to permit the nut 40 to be screwed up as high as desired.

It is to be noted that the arms 19 are of substantial length, preferably materially longer than the diameter of the idler 22, and that the axis of rotation of the idler in its prefererd normal position is approximately at about the level of the axis of oscillation 16 of the arms 19. Consequently, when the idler 22 moves up and down in passing over rough ground, its bodily movement is substantially vertical and is along an arc of relatively great radius, so that it has little tendency to stretch or slacken the endless member 23. It is found in actual tests that this arrangement is extremely satisfactory.

Running on the lower reach of the track between the sprocket 25 and the idler 22 are one or more weight supporting wheels, which may be of any desired number. In the construction at present preferred, there are wheels 51 and 52 mounted on a front bogie truck 55, and wheels 53 and 54 mounted on a rear bogie truck 56. The weight of the vehicle (or that part of the weight which is intended to be carried by these trucks) is transmitted from the frame to the bogie trucks by any suitable means, preferably by resilient means in the form of a pair of leaf-springs 57 (Figs. 4 and 8) having their front ends connected to the front bogie truck 55 and their rear ends connected to the rear bogie truck 56 and mounted at substantially their mid portions on a fixture or bearing 58 on the transverse member 16.

This bearing 58 may be fixed to the transverse member 16 if desired, in which case when the vehicle passes over rough ground the bogie trucks 55 and 56 move upwardly or downwardly entirely by flexing the springs 57. In most cases it is preferred, however, to make the bearing member 58 rotatable on the transverse shaft 16, so that the weight is somewhat better equalized between the two bogie trucks. Thus when one truck is forced upwardly by passing over a hump in the ground, this not only flexes the ends of the springs attached to that truck, but also tends to turn the entire spring assembly slightly around the cross shaft 16, so that the springs press downwardly more firmly on the other bogie truck and transfer a proper part of the weight to it.

The wheels of the bogie trucks, like those of the idler 22, preferably are split, being in effect two wheels side by side with a groove or slot between them, as plainly shown in Fig. 8. This permits the guiding lugs 24 on the track to extend upwardly into the slots of the wheels, and keeps the track and wheels alined with each other.

The wheels of the rear bogie truck are usually found in practice to be sufficiently held in alinement with the track by the lugs 24, coupled with the alining effect of the springs 57 themselves. The rear ends of the springs may be connected to the truck by encircling suitable transversely extending pins 60 on the truck. The front bogie truck, however, may be subjected to greater lateral thrust and displacing force when passing over rough ground, and for this reason it is desirable to provide additional alining means for the front truck. This additional means may be of any suitable form, such as an arm or link 65 connecting the front truck to the frame and pivoted both to the truck and to the frame to allow free upward and downward movement of the truck, but being relatively unyielding in a transverse or lateral direction so as to hold the front truck properly alined and prevent twisting or lateral displacement.

The arm or link 65 is preferably relatively wide as shown in Fig. 5 of the drawings, so that it has a relatively wide firm bearing on a pivot 66 by which it is attached to any suitable part, such as to the member 58 mounted on the cross shaft 16. For instance, it may have two spaced bearing portions 66ª for encircling the pivot 66 at spaced points. The opposite end of the link 65 is provided with a relatively wide firm bearing 67ª for engaging a cross pin 67 on the bogie truck 55. The link 65 itself is preferably curved or bowed upwardly between its ends, as plainly shown in Fig. 4, so that it will not interfere with the wheel 52 or other parts of the apparatus. The link may be of any suitable rigid material, preferably being formed from a single piece of metal and having a wide top web connecting the depending stiffening ribs 70, 71 and 72. Thus the link 65 has great lateral stiffness and rigidity, and serves admirably to hold the bogie truck 55 against lateral displacement, while readily allowing upward and downward movement of the truck so far as permitted by the springs 57.

Suitable means may be provided for limiting the extent of oscillation of the bogie truck 55 about its pivot 67 when passing over rough ground. For example, the side ribs 70 and 72 of the link 65 may be extended to form stop lugs 74 for engagement with lugs 75 on the side frame members of the bogie truck 55 when the front end of the bogie truck is tipped up to a predetermined extent, and the link 65 may also be formed with other stop lugs 76 for engagement with lugs 77 on the bogie truck when the rear end of the truck is tipped up to a predetermined extent.

It is apparent that the upward and downward movements of the bogie truck 55 are confined and guided by the link 65 so that the pin 67 on the truck, when moving upwardly or downwardly will not move quite vertically but will move along an arc having the pivot 66 as its center. Since the pivot 66 does not correspond to the center of movement of the front ends of the springs 57, it follows that there will be a slight relative longitudinal movement between the springs 57 and the bogie truck 55 during the upward and downward movement of the latter. In order to permit such relative longitudinal movement, the front ends of the springs are not connected to the front bogie truck in the same way the rear ends are connected to the rear bogie truck, but, on the contrary, the front ends of the springs 57 are received slidably in slots 80 in fixtures 81 mounted on the bogie truck, as best shown in Fig. 6. The slots 81 have a thickness from top to bottom slightly greater than the thickness of the ends of the springs which are received in the slots, so that the springs are capable of slight longitudinal movement within the slots as the bogie truck moves up and down. At the same time, the lower surfaces of the slots 80 form surfaces on which the front ends of the springs bear, in order to transmit the weight from the springs to the truck. This relative movement between the springs and the truck could also be accommodated by the use of spring shackles of any ordinary and well known form.

The rear bogie truck may be provided with lugs 85 normally at some distance above the rear portions of the springs 57, so that these lugs may come down into contact with the tops of the springs to limit the possible extent of turning of the bogie truck about its pivot 60, in case the rear wheel 54 is elevated to an abnormal extent.

The construction thus far described is found to provide a very satisfactory and efficient track mechanism. It is noted that the bottom edge of each driving member 25 is in a position elevated somewhat above the ground level, so that the track 23 extends obliquely downwardly for a short distance to the front bogie wheel 51. This inclination of the track makes it easy for the track to surmount reasonable obstructions. The weight of the rear end of the vehicle is carried mainly on the bogie truck wheels, with perhaps a part of the weight carried by the rear idler wheels 22 unless the nuts 40 are screwed up so far that the idler wheels are held up above the ground. The weight is fairly evenly distributed at all times and is not concentrated in any one place. Even when pasing over a concavity in the ground, or when passing off an obstruction, the bogie truck wheels carry their full share of the weight, because the rear idler 22 then moves upwardly, which permits the bogie truck wheels and the track beneath them to come down into contact with the ground. Thus even a reasonable elevation or obstruction immediately beneath the idler 22 alone does not result in concentrating the weight on the idler, but still permits it to be evenly distributed. It is likewise apparent that an obstruction beneath any one or more of the bogie truck wheels will not prevent the rest of the wheels from carrying their share of the load.

It is desirable to have the upper reach of the track 23 extend substantially straight between the idler 22 and the sprocket 25. In order to assist in supporting this upper reach, intermediate supporting means is provided, preferably in the form of a roller 90 approximately midway between the idler 22 and the sprocket 25, as shown particularly in Figs. 4 and 7. The track will sag, of course, to a slight extent between the roller 90 and the members 22 and 25, but ordinarily, when the track is at the proper tension, this sagging is slight and the track may be considered as running substantially straight from the idler to the sprocket.

As previously mentioned, the idler 22 is preferably capable of upward and downward movement in accordance with irregularities of the ground over which the vehicle travels. It is obvious that if the intermediate supporting roller 90 were mounted in stationary position and the idler 22 were to move up and down, the upper reach of the track might be in contact with the intermediate supporting roller 90 when the idler 22 was in a lower position, but might be raised entirely off of the supporting roller 90 when the idler was moved to an upper position. This might be a serious disadvantage if the vehicle were travelling at high speed, for the track member moving at a high rate and slapping up and down on the roller 90 might quickly wear out the track and the roller. To obviate this, the present invention provides means for raising and lowering the roller in accordance with the upward and downward movements of the idler 22, so that the roller at all times is kept in contact with the track member notwithstanding the upward and downward movements of the idler.

This is accomplished, according to the present invention, by making the supporting roller 90 movable, and by providing an operative connection between it and the idler 22, so that the roller 90 is moved up or down when the idler moves up or down, through an amount sufficient to compensate for the resulting difference in position of the upper reach of the track. Preferably this operative connection is a substantially rigid unyielding connection which will move the supporting roller 90 positively and insure its being properly positioned at all times.

One suitable form of construction for doing this is illustrated particularly in Figs. 4, 7, and 8. As here shown, the roller 90 is mounted on a short axle or shaft 91 which is held by a pair of arms 92 fixed to a shaft 93 mounted for oscillation in bearings 94 on the upper sides of the arms 19 somewhat rearwardly of the point at which these arms are connected to the cross shaft 16. The shaft 93 carries another arm 95 fixed to the inner end of the shaft and extending approximately diametrically opposite to the arms 92, as shown especially in Fig. 7, and the end of this arm 95 is connected by a link 96 to a bracket 97 fixed to any suitable part of the frame. Thus the arms 92 and 95 fixed on the shaft 93 act in effect as a lever fulcrumed at an intermediate point at 93, and carrying the roller 90 at one end and connected by the link 96 to the frame at the other end of this lever.

It is apparent that as the arms 19 move upwardly from the position shown in Fig. 4, the fulcrum 93 will be raised upwardly and, since the link 96 is connected to a fixed part, this will cause downward movement of the arm 95 and consequent upward movement of the arms 92 and of the roller 90. Reversely, downward movement of the arms 19 will cause the link 96 to pull upwardly on the arm 95 and will lower the roller 90.

The relative proportions of the lever arms 92 and 95 and the location at which the fulcrum 93 is mounted on the arms 19, are so chosen and designed that the upward and downward movements of the supporting roller 90 will keep the upper edge of this roller at all times substantially on a line running straight from the member 22 to the member 25, irrespective of the upward or downward position of the idler 22. In this way, as above mentioned, the position of the intermediate supporting member 90 is accommodated to the different positions of the track member 23, and the track is adequately supported at all times notwithstanding the movements of the idler 22 which may move upwardly or downwardly when passing over rough ground or which may be held in a higher or lower position by adjustment of the nut 40.

In a vehicle of this type, the front wheels 12 are normally in contact with the ground, and steering of the vehicle is accomplished by turning the wheels 12 in the usual manner common in automobiles. Under some unusual or abnormal conditions, however, as for example when the vehicle is about half way over a sharp ridge or hump, the front wheels 12 may be entirely out of contact with the ground, or they have such slight traction (because of ice, soft mud, etc.) that they will not steer the vehicle effectively. It is important, under these conditions, to have other means for steering the vehicle in order that its direction of travel may be changed if necessary during such abnormal conditions. This steering means, according to the present invention, comprises means for selectively braking the drive of the endless track member on one side or the other of the vehicle, thus stopping the driving of the vehicle on one side and permitting the drive to continue on the other side with the result that the vehicle will be turned or twisted with relation to its former position. At the same time, it is desirable to have brakes for normal use applied both to the front wheels 12 and to the endless track members, so that the vehicle can be brought to a quick stop or can be held firmly on steep slopes.

The braking arrangements of the present invention are best shown in Figs. 1 to 3 inclusive. As part of the brake rigging, there is provided a transverse shaft 101 mounted for rotation in suitable bearings on the frame 11, and to this shaft is fixed a pair of arms 102 extending downwardly near opposite ends of the shaft, from which arms brake rods 103 run to brake shoes of any suitable known construction on the respective front wheels 12 of the vehicle. Another arm 104, also fixed to the shaft 101 at an intermediate point, extends upwardly from the shaft and is connected by a rod 105 to the brake pedal 106. When the operator pushes on the brake pedal 106, the rod 105 is pulled forwardly, the shaft 101 is turned in a counterclockwise direction when viewed as in Fig. 1, and the rods 103 are pulled rearwardly, applying the brakes to the front wheels 12.

For applying the brakes concomitantly to the track mechanism, the shaft 101 is further provided with an arm 110 loosely mounted on the shaft near one end, and an arm 111 secured to a sleeve 112 loosely mounted on the shaft near the other end. The hub or boss of the arm 110 is provided with a lug 113 which is capable of limited circumferential movement in a space or notch formed in a collar 114 secured to the shaft 101 at one side of the arm 110, the arm 102 lying on the other side of the arm 110 and serving to hold it against axial displacement away from the collar 114. When the parts are in their normal position with the brakes not applied, the rear edge of the lug 113 is in contact with the corresponding end of the slot or space in the collar 114, as shown in Fig. 3. Consequently, any counterclockwise movement of the shaft 101 and collar 114 would result in corresponding counterclockwise movement of the arm 110, but it is apparent that the arm 110 may move counterclockwise independently of the shaft 101 while the shaft 101 remains stationary.

A similar connection is made between the sleeve 112 and the hub or boss of the arm 104. As shown in Fig. 2, the left hand end of the sleeve 112 is provided with a lug 115 which is capable of limited circumferential movement in a peripheral space or slot in the hub of the arm 104, and the sleeve is held from axial disengagement by the right hand arm 102. Thus the sleeve 112 and arm 111, like the arm 110, are turned in a counterclockwise direction whenever the shaft 101 moves counterclockwise, but are capable of moving in a counterclockwise direction independently of the shaft when the shaft remains stationary.

Suitable rods or cables 120 extend rearwardly from the respective arms 110 and 111 to the left hand and right hand track mechanism respectively, and are operatively connected to brakes on any suitable part of the track mechanism, the brakes preferably applying on brake drums attached to the respective drive sprockets 25.

From the foregoing, it is apparent that when the brake pedal 106 is depressed and the shaft 101 is turned in a forward or counterclockwise direction as above described, it will not only pull rearwardly on the rods 103 to apply the brakes to the front wheels 12, but also will pull forwardly on the rods or cables 120 in order to apply the brakes to the track mechanism on both sides of the vehicle.

Other means is provided for moving either one of the rods 120 independently of the other brake rods in order to apply the brakes selectively only to the track mechanism on one side or the track mechanism on the other side of the vehicle, as desired. This other means may comprise a pair of hand levers 122 and 123 suitably fulcrumed near their lower ends and connected below their lower ends to rods 124 and 125 respectively, which are connected respectively to the arm 110 and to an arm 126 fixed to the sleeve 112. Hence, when the operator pulls rearwardly on the lever 122, this pulls the rod 124, turns the arm 110 in a counterclockwise direction when viewed as in Figs. 1 and 3, without affecting the shaft 101 or any of the other arms on the shaft, and applies the brake to the driving sprocket 25 on the left hand side of the vehicle, thus braking the track mechanism on the left side alone. In this way, the vehicle could be turned to the left even if the front wheels 12 are out of contact with the ground, by continuing the drive of the right hand side of the vehicle, which drive is effective through the usual differential mechanism so that if one track mechanism be held, the other will nevertheless be driven.

If, on the other hand, the operator pulls rearwardly on the lever 123, this will result in pulling forwardly on the rod 125 connected to the arm 126, which will rock the sleeve 112 in a counterclockwise direction and likewise rock the arm 111 secured to the sleeve, thereby pulling forwardly on the brake rod or cable 120 which is connected to the right hand drive sprocket 25, and apply the brake to the right hand track mechanism without affecting the left hand track mechanism or the front wheels.

It may be said, therefore, that there is provided brake mechanism (operated by the pedal 106) for applying brakes concomitantly to the front wheels and to both of the track mechanisms; and also means (the levers 122 and 123) for applying brakes selectively to only one or the other of the track mechanisms, entirely independently of the front wheel brakes and entirely independently of the other track mechanism, to which the brake is not applied. Also it is apparent that by pulling back on both of the levers 122 and 123, the brakes would be applied to both of the track mechanisms on both sides of the vehicle, but would not be applied to the front wheels 12.

The vehicle of the present invention is preferably constructed from a commercial automobile truck chassis by making minor changes throughout and applying the track mechanism in place of the rear wheels. For example, in some commercial types of automobile trucks, the rear axle comes at approximately the point where the bracket 17 of the present invention is placed. According to the present invention, the rear axle is removed from this location and moved forwardly to the location in which the driving sprockets 25 are shown. The same standard rear axle is fastened to the frame 11 at its new location, the drive shaft of the automobile simply being shortened somewhat in order to accommodate it to the new forward position of the rear axle, and the usual internal combustion engine drives the rear axle through the usual transmission mechanism, without change. The wheels are taken off and the driving sprockets 25 are attached to the rear axle in place of the rear wheels.

The brackets 17 and cross shaft 16 are secured to the frame in the same location or approximately the same location which the rear axle originally occupied in the commercial automobile chassis, and the arms 19, rear idlers 22, bogie trucks, and associated parts, are applied. The brake rigging of the vehicle is modified as above indicated. With these few simple changes, the standard commercial automobile truck or chassis readily obtainable on the open market, is converted into an inexpensive and satisfactory vehicle of the half track laying type, to which any form or style of body may be applied, to adapt the vehicle to military or commercial purposes or any other desired use.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A vehicle comprising a frame, a rotary member mounted on said frame, an arm pivotally connected to said frame for oscillation upwardly and downwardly, a second rotary member mounted on said arm so that said second rotary member may move bodily upwardly and downwardly with respect to said frame, endless track means running around and between said rotary members, a lever pivotally mounted on said arm, a roller mounted on said lever for supporting the upper reach of said endless track means at a point intermediate said rotary means, and a connection between said lever and said frame for moving said lever and consequently shifting the position of said roller in accordance with movements of said arm.

2. A vehicle comprising a frame, a rotary member mounted on said frame, an arm pivotally connected to said frame for upward and downward oscillation, a second rotary member mounted on said arm so that said second rotary member may move bodily upwardly and downwardly with respect to said frame, endless track means running around and between said rotary members, roller means for supporting the upper reach of said endless track means at a point between said rotary means so that said upper reach will extend in a substantially straight line between said rotary means, an oscillatable device pivotally mounted on said arm for supporting said roller means, and a link connecting said device to said frame so that said device will be moved and the position of said roller means will be shifted in accordance with oscillations of said arm and upward and downward movements of the rotary member mounted thereon.

3. A vehicle comprising a frame, a rotary member mounted on said frame, an arm mounted for oscillation upwardly and downwardly with respect to said frame, a second rotary member mounted on said arm so that said second rotary member may move bodily upwardly and downwardly with respect to said frame, endless track means running around and between said rotary members, roller means mounted for bodily movement with respect both to said arm and to said frame for supporting the upper reach of said endless track means at a point between said two rotary members, and means controlled by the upward and downward movements of said second rotary member for shifting said roller means with respect both to said frame and to said arm to maintain said roller means substantially in contact with said upper reach of said endless track means notwithstanding upward and downward movements of said upper reach.

4. A vehicle comprising a frame, a rotary member mounted on said frame, an arm pivotally connected to said frame for oscillation upwardly and downwardly about an axis fixed with respect to said frame, a second rotary member mounted on said arm so that said second rotary member may move bodily upwardly and downwardly with respect to said frame, endless track means running around and between said rotary members, roller means mounted for bodily movement with respect both to said arm and to said frame for supporting the upper reach of said endless track means at a point between said two rotary members, and means controlled by the upward and downward movement of said second rotary member for shifting said roller means with respect both to said frame and to said arm to maintain said roller means substantially in contact with said upper reach of said endless track means notwithstanding upward and downward movements of said upper reach.

DAVID FERGUSSON.

CERTIFICATE OF CORRECTION.

Patent No. 2,041,599. May 19, 1936.

DAVID FERGUSSON.

It is hereby certified that the name of the assignee in the above numbered patent was erroneously written and printed as "James Cunningham Son & Company" whereas said name should have been written and printed as James Cunningham, Son & Company, of Rochester, New York, a corporation of New York, as shown by the records of assignments in this office; and that the said Letters Patent should be read with this correction therein that the same may conform to the record of the case in the Patent Office.

Signed and sealed this 21st day of July, A. D. 1936.

(Seal)

Henry Van Arsdale
Acting Commissioner of Patents.